(12) United States Patent
Govindarajan

(10) Patent No.: US 12,555,491 B2
(45) Date of Patent: Feb. 17, 2026

(54) INCLUSIVE INTELLIGENCE FOR DIGITAL WORKPLACE

(71) Applicant: S&P Global Inc., New York City, NY (US)

(72) Inventor: Saisreenath Srinivasan Govindarajan, McKinney, TX (US)

(73) Assignee: S&P Global Inc., New York, NY (US)

( * ) Notice: Subject to any disclaimer, the term of this patent is extended or adjusted under 35 U.S.C. 154(b) by 217 days.

(21) Appl. No.: 18/466,230

(22) Filed: Sep. 13, 2023

(65) Prior Publication Data

US 2025/0087111 A1 Mar. 13, 2025

(51) Int. Cl.
| | |
|---|---|
| G09B 21/00 | (2006.01) |
| G10L 13/047 | (2013.01) |
| G10L 15/06 | (2013.01) |
| G10L 15/183 | (2013.01) |
| G10L 15/22 | (2006.01) |

(52) U.S. Cl.
CPC .......... *G09B 21/006* (2013.01); *G10L 13/047* (2013.01); *G10L 15/063* (2013.01); *G10L 15/183* (2013.01); *G10L 15/22* (2013.01); *G10L 2015/223* (2013.01)

(58) Field of Classification Search
CPC ... G09B 21/006; G10L 13/027; G10L 13/047; G10L 15/063; G10L 15/183; G10L 15/22; G10L 2015/223
See application file for complete search history.

(56) References Cited

U.S. PATENT DOCUMENTS

2022/0091681 A1* 3/2022 Darmour ............... G06F 3/0346
2024/0338398 A1* 10/2024 Huang ................. G06F 16/3344

* cited by examiner

*Primary Examiner* — Angela A Armstrong
(74) *Attorney, Agent, or Firm* — Yee & Associates, P.C.

(57) ABSTRACT

A computer-implemented method of providing information to a user is provided. The method comprises receiving input of a selected operating mode and extracting, via an extraction pipeline, data from a number of data sources according to the selected operating mode. The extracted data is fed into a large language model (LLM), and the LLM generates verbal and auditory information for the user based on the data. The LLM conveys the verbal and auditory information to the user via a number of interface products according to the selected operating mode.

25 Claims, 7 Drawing Sheets

INCLUSIVE INTELLIGENCE FOR DIGITAL WORKPLACE

BACKGROUND INFORMATION

1. Field

The present disclosure relates generally to an improved computing system, and more specifically to a system that provides verbal and auditory information to users that are visually impaired.

2. Background

A large percentage of visually impaired people are unemployed. For those who are employed, assistance in work environments is limited. While a few existing technologies can provide information on the environment around a visually impaired person there is no comprehensive solution for people with visual challenges in a digital workplace.

Therefore, it would be desirable to have a method and apparatus that takes into account at least some of the issues discussed above, as well as other possible issues.

SUMMARY

An illustrative embodiment provides a computer-implemented method of providing information to a user. The method comprises receiving input of a selected operating mode and extracting, via an extraction pipeline, data from a number of data sources according to the selected operating mode. The extracted data is fed into a large language model (LLM), and the LLM generates verbal and auditory information for the user based on the data. The LLM conveys the verbal and auditory information to the user via a number of interface products according to the selected operating mode.

Another illustrative embodiment provides a system for providing information to a user. The system comprises a storage device that stores program instructions and one or more processors operably connected to the storage device and configured to execute the program instructions to cause the system to: receive input of a selected operating mode; extract, via an extraction pipeline, data from a number of data sources according to the selected operating mode; feed the extracted data into a large language model (LLM); generate, by the LLM, verbal and auditory information for the user based on the data; and convey, by the LLM, the verbal and auditory information to the user via a number of interface products according to the selected operating mode.

Another illustrative embodiment provides a computer program product for providing information to a user. The computer program product comprises a computer-readable storage medium having program instructions embodied thereon to perform the steps of: receiving input of a selected operating mode; extracting, via an extraction pipeline, data from a number of data sources according to the selected operating mode; feeding the extracted data into a large language model (LLM); generating, by the LLM, verbal and auditory information for the user based on the data; and conveying, by the LLM, the verbal and auditory information to the user via a number of interface products according to the selected operating mode.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that for visually impaired employees, assistance in work environments is limited. The illustrative embodiments also recognize and take into account that among existing technologies for visually impaired employees there is no comprehensive solution for a digital workplace.

The illustrative embodiments provide a vision augmentation system that can substitute for or complement the sense of sight by means of audio, thereby creating a virtual eye for the user. The system provides audio cues for the user based on the environment around the user. The system is tailored to a modern workplace by employing cognitive solutions such as synthesized speech, natural language processing (NLP), and generative artificial intelligence (AI) capabilities.

The illustrative embodiments leverage data from enterprise products and integrate the generative AI capabilities into further actions to wholistically allow users both with and without visual impairments to perform job functions end-to-end with a single comprehensive system in the workplace.

Figure 1:
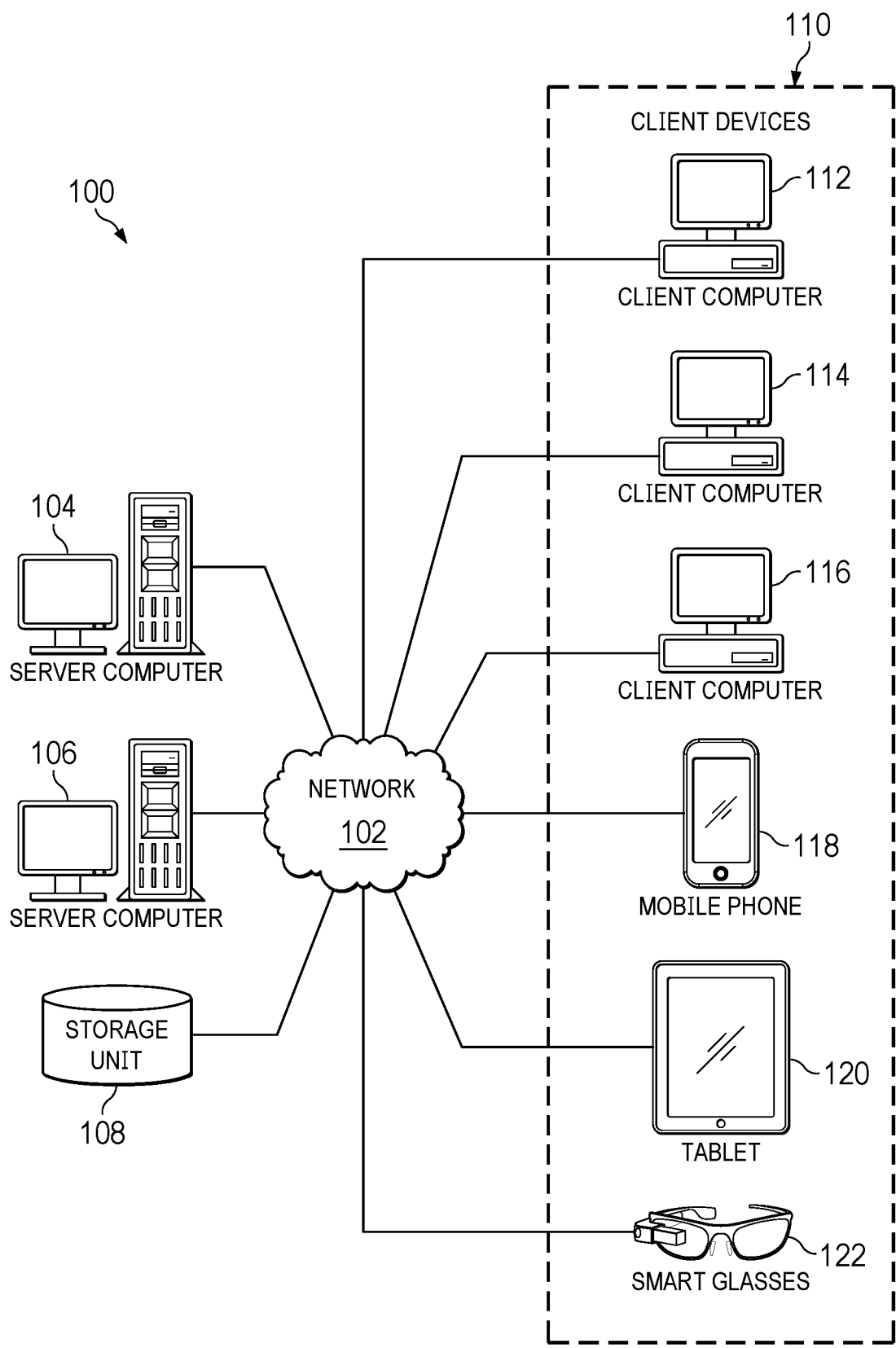
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 includes client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
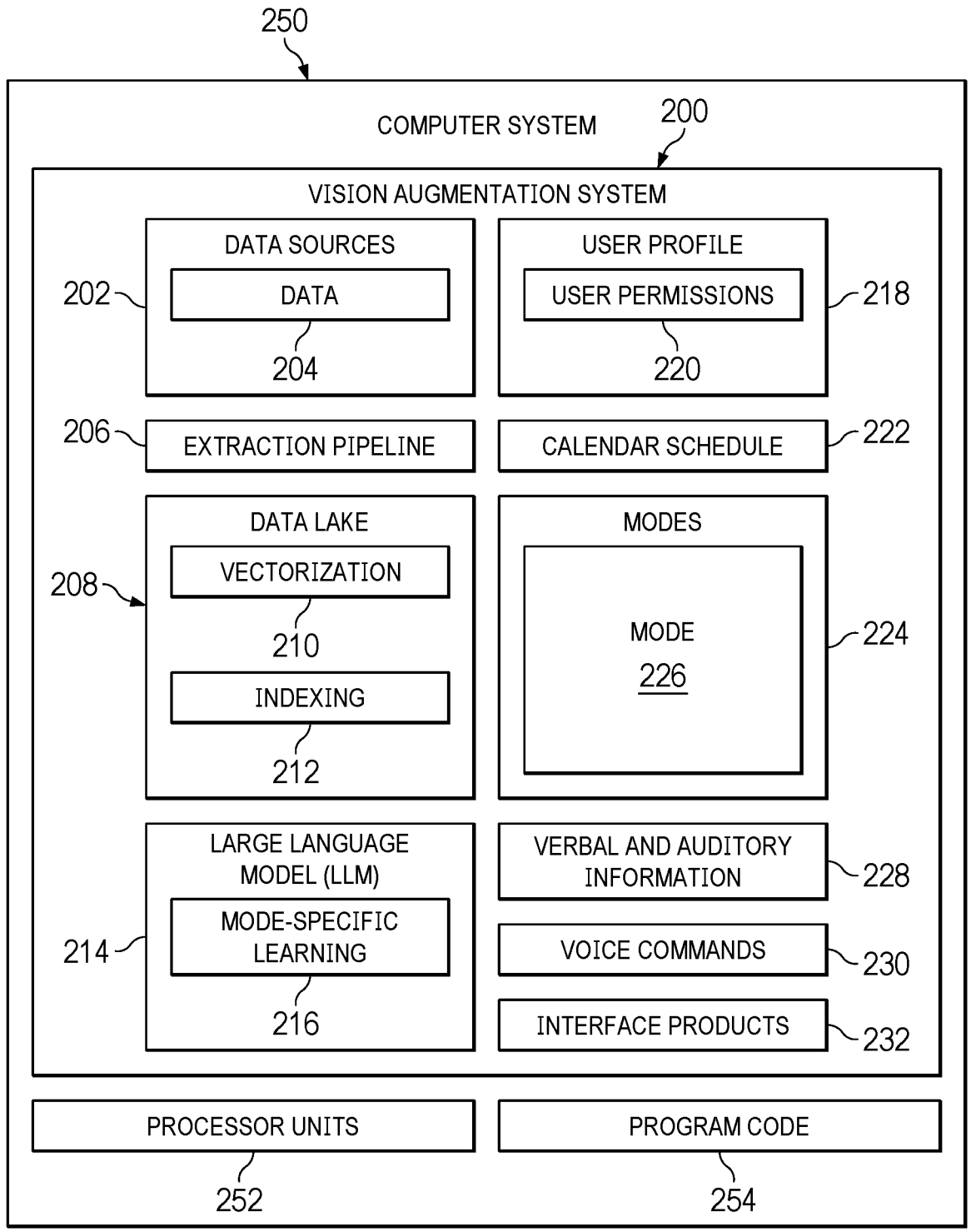
FIG. 2 is a block diagram of a vision augmentation system depicted in accordance with an illustrative embodiment.

FIG. 2 is a block diagram of a vision augmentation system depicted in accordance with an illustrative embodiment. Vision augmentation system 200 might be implemented in network data processing system 100 in FIG. 1.

Figure 3A:
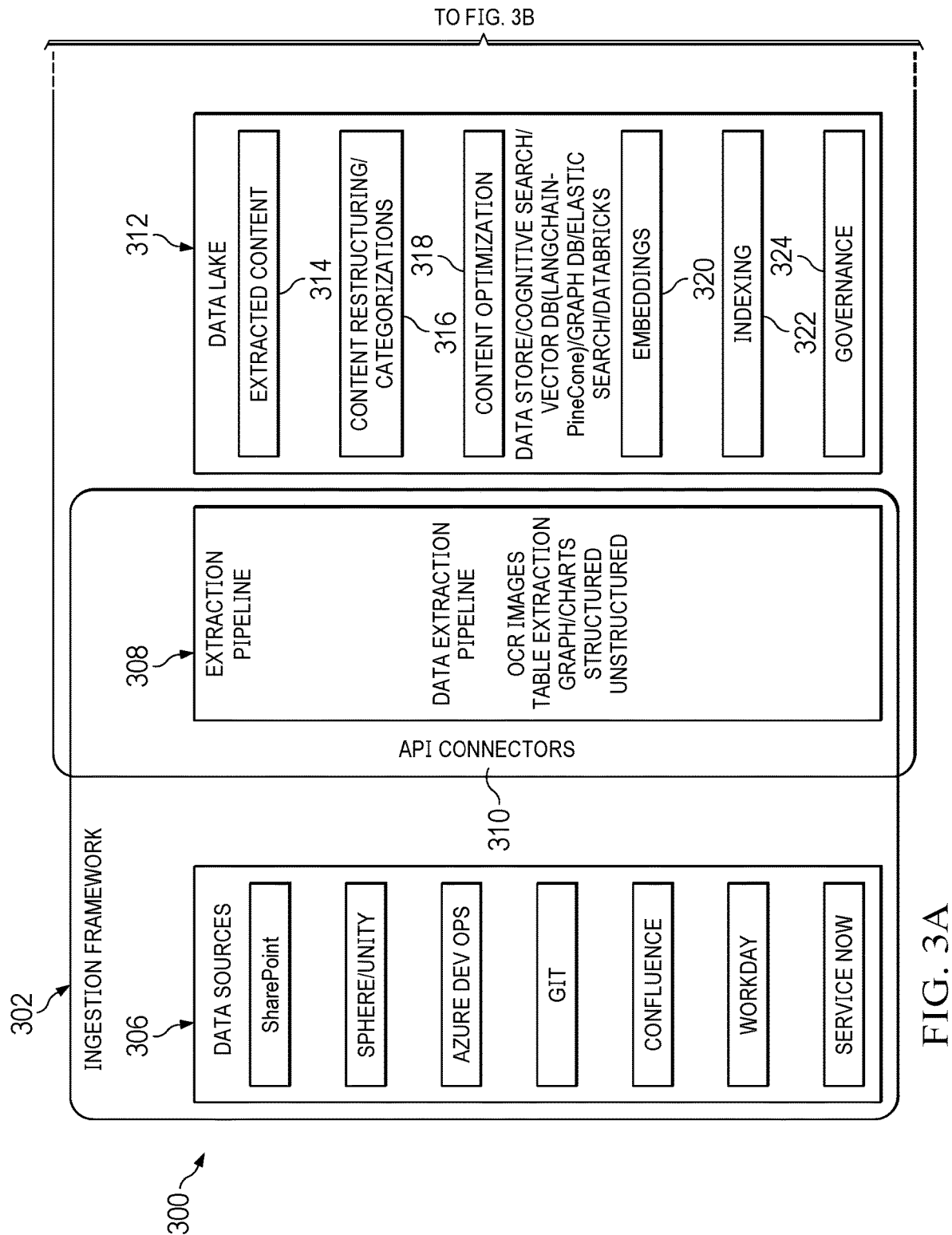
FIG. 3A depicts a diagram illustrating the architecture of a vision augmentation system in accordance with an illustrative embodiment.
Figure 3B:
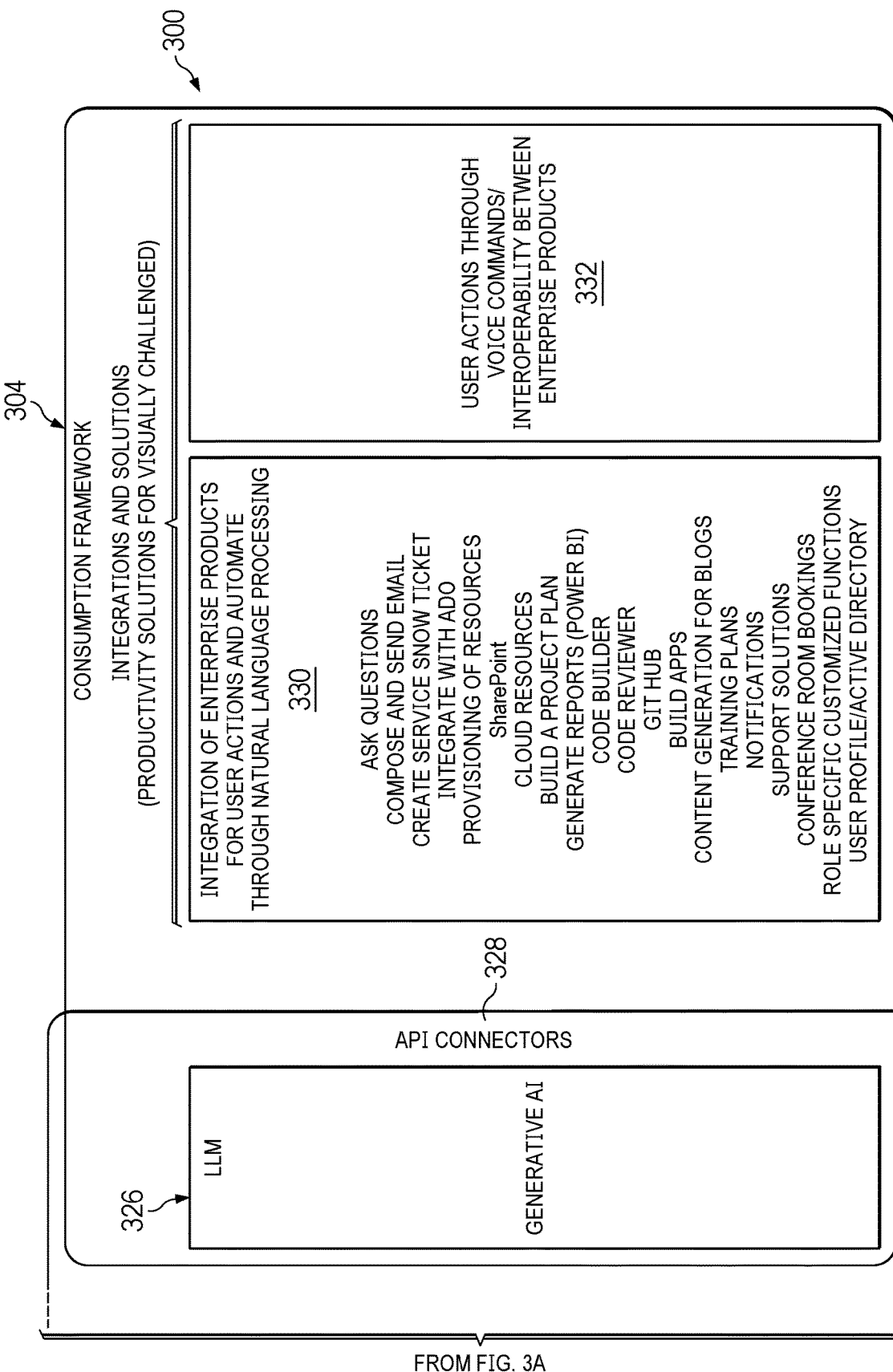
FIG. 3B depicts a diagram illustrating the architecture of a vision augmentation system in accordance with an illustrative embodiment.

Vision augmentation system 200 draws data 204 from a number of different data sources 202 via an extraction pipeline 206 (see FIGS. 3A and 3B). The data sources can include productivity platforms, mobile devices, cameras, or smart glasses. Examples of the types of data extracted by the extraction pipeline 206 include visual data, text data, optical character recognition images, data tables, graphs, charts, structured data, or unstructured data.

Vision augmentation system 200 extracts data 204 from specific data sources 202 and conveys the data to the user according to a specific mode 226 of operation selected from a number of different modes 224 available to the user. The selected mode 226 will depend on the type of activity in which the user is engaged (see FIG. 4). The modes 224 might be selected manually by the user via voice commands 230. The modes 224 might also be selected automatically according to a calendar schedule 222 that designates when the user is going to be engaged in specific activities, e.g., meetings, arriving at or leaving the office, blocked off working periods, etc.

The data 204 extracted from the data sources 202 may also be extracted according to a user profile 218. User profile 218 may specify the needs of the user regarding what types of information the user typically uses, and the functions performed by the user. User profile 218 might also include user permissions 220 that limit what information the user is allowed to access.

The extracted data might be stored in data lake 208 where it undergoes vectorization 210 and indexing 212. Vision augmentation system 200 can crawl the vectorized and indexed data to implement governance policies according to the user permissions 220.

The extracted data is fed into a large language model (LLM) 216 that generates verbal and auditory information 228 for the user in response to voice commands 230 according to the selected mode 226 of operation the user has chosen.

Vision augmentation system 200 can convey the verbal and auditory information 228 to the user via a number of interface products 230.

Vision augmentation system 200 can be implemented in software, hardware, firmware, or a combination thereof. When software is used, the operations performed by vision augmentation system 200 can be implemented in program code configured to run on hardware, such as a processor unit. When firmware is used, the operations performed by vision augmentation system 200 can be implemented in program code and data and stored in persistent memory to run on a processor unit. When hardware is employed, the hardware can include circuits that operate to perform the operations in vision augmentation system 200.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 250 is a physical hardware system and includes one or more data processing systems. When more than one data processing system is present in computer system 250, those data processing systems are in communication with each other using a communications medium. The communications medium can be a network. The data processing systems can be selected from at least one of a computer, a server computer, a tablet computer, or some other suitable data processing system.

As depicted, computer system 250 includes a number of processor units 252 that are capable of executing program code 254 implementing processes in the illustrative examples. As used herein, a processor unit in the number of processor units 252 is a hardware device and is comprised of hardware circuits such as those on an integrated circuit that respond and process instructions and program code that operate a computer. When a number of processor units 252 execute program code 254 for a process, the number of processor units 252 is one or more processor units that can be on the same computer or on different computers. In other words, the process can be distributed between processor units on the same or different computers in a computer system. Further, the number of processor units 252 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

FIGS. 3A and 3B depict diagrams illustrating the architecture of a vision augmentation system in accordance with an illustrative embodiment. Architecture 300 is an example implementation of vision augmentation system 200 shown in FIG. 2. The example illustrated in FIGS. 3A and 3B is indicative of operation in a work mode (see FIG. 4).

Architecture 300 comprises an ingestion framework 302 and a consumption framework 304. Ingestion framework 302 comprises a number of data sources 306 and an extraction pipeline 308. In the present example, the data sources 306 include work productivity platforms such as, e.g., SharePoint®, Git®, Workday®, etc., which the user might use for work.

The extraction pipeline 308 interacts with the data sources 306 via application programming interface (API) connector 310 to extract data. Extraction pipeline 308 might extract, e.g., optical character recognition (OCR) images, tables, graphs and charts, as well as structures and unstructured data.

Extracted content/data 314 can be stored in a data lake 312 where it can be processed for use by LLM 326 in consumption framework 304. The extracted data 314 can undergo content restructuring and categorization 316 and content optimization 318 for use by LLM 326.

The extracted data can also be vectorized into embeddings 320. The vectorized data by then undergo indexing 322 and subjected to governance policies 324 to filter the data according to user security permissions.

LLM 326 provides generative artificial intelligence (AI) capabilities using the prepared, extracted data from the data lake 312. Generative AI learns patterns and structures of input data to produce new data that has similar characteristics. Through API connectors 328, LLM 326 is able to interact with a number of different enterprise products 330 to assist the user. In the present example, the enterprise products 330 might be the same productivity platforms comprising data sources 306 or other platforms that interact with the data sources 306. The generative AI capabilities provided by LLM 326 allow the user to interact with the enterprise products 330 via voice commands 332 and receive output from the enterprise products 330 in the form of (synthesized) verbal and auditory signals without the need to type, click, etc., on a screen or read a screen.

Figure 4:
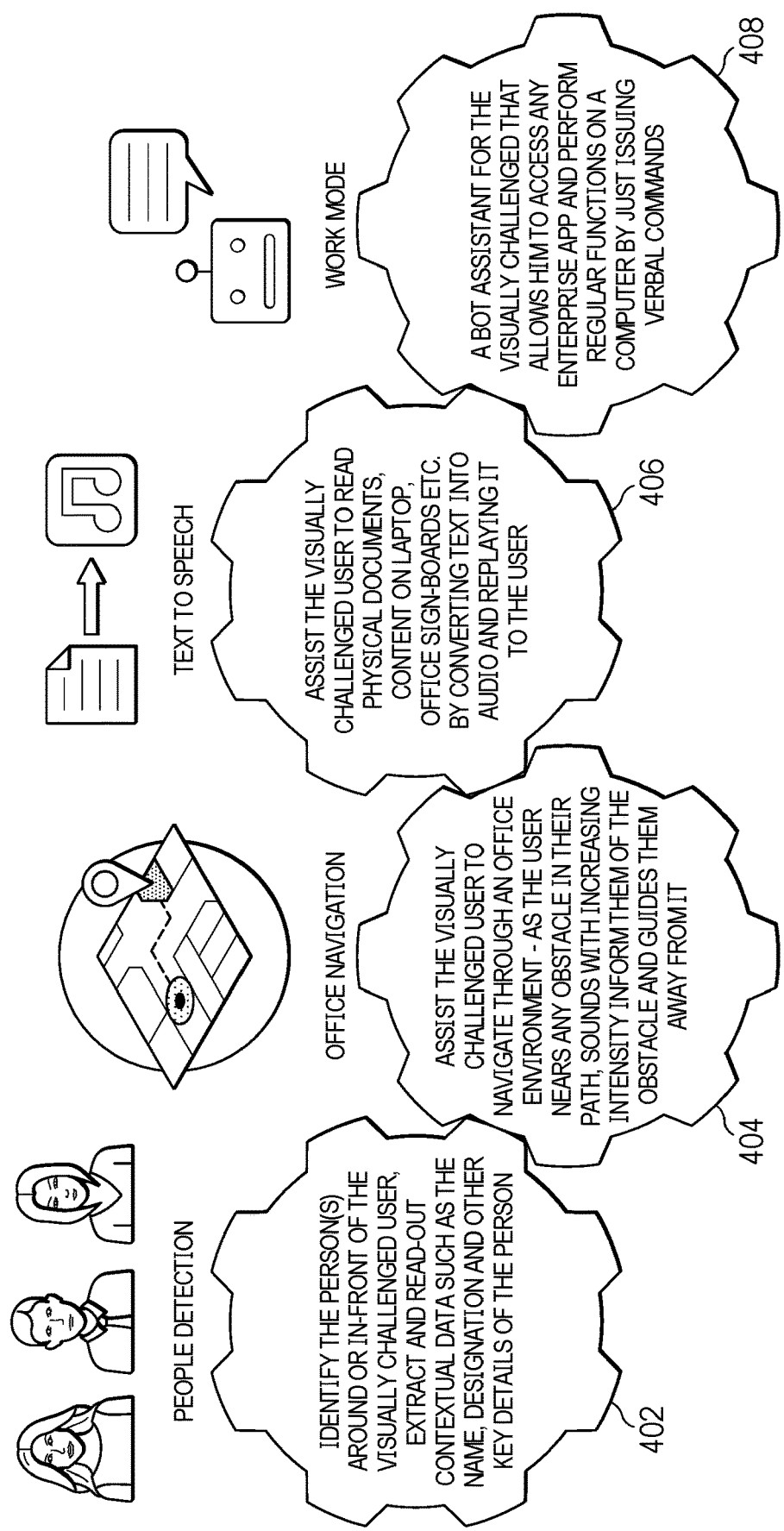
FIG. 4 depicts a diagram illustrating different operating modes in accordance with an illustrative embodiment.

FIG. 4 depicts a diagram illustrating different operating modes in accordance with an illustrative embodiment. The present example comprises four different operating modes for the vision augmentations system.

People detection mode 402 identifies persons in proximity to the visually challenged user. The system can extract and read out contextual data such as the names of people, using name tags and/or facial recognition, designations, and other key details of the person(s) in question. Facial recognition technology might also be used to interpret moods. The data for people recognition mode 402 might be captured and extracted through cameras and similar sensors such as on a mobile device used by the user. The relevant information can be conveyed to the user via a synthesized voice generated by the device.

In people detection modes 402, the system might capture people in proximity to the user and compare the images to an active directory and provide their details related to work such as name, ID, role, etc.

Office navigation mode 404 assists the visually challenged user to navigate through an office or similar type of environment (e.g., store). As the user nears any obstacle in his or her paths the system can generate sounds with increasing intensity to indicate the proximity of such obstacles to help guide the user away from them.

Text-to-speech mode 406 assists the user to read physical documents, contents on screen, signs, etc. by converting text into audio and replaying it to the user. If there is an object associated with the text, the system can also provide a verbal description of the object to the user (e.g., printed paper, sign, etc.).

Work mode 408 assists the user in working on a system via voice commands for specific actions such as, e.g., open email, type text, review, etc. Work mode 408 allows the user to access applications and perform regular functions on a computer without the need to type or read a screen.

With continued use, the LLM undergoes mode-specific learning to better meet the needs of the specific user under the different operating modes. The LLM learns to generate verbal and auditory information for the user according to the selected operating mode. The more the system is used, the more it will learn and adapt to users' need, resulting in an increasingly efficient and personalized user experience.

The illustrative embodiments allow the user to switch between the different operating modes according to the user's needs. The switching between different operating modes can be accomplished "manually" via verbale commands by the user and likely would be used at different points throughout the day. For example, the user might switch to people detection mode 402 upon arriving at the office in the morning and leaving at the end of the day or during meetings. During regular works hours, the user would switch to word mode 408.

In addition, some of the operating modes might operate concurrently. For example, when entering the office or a store, the user might set the system in both people detection mode 402 and navigation mode 404 to identify and greet people as well as avoid objects as the user moves toward the user's office or workspace. Similarly, during a meeting the user might use people detection mode 402 in combination with text-to-speech mode in order to identify and interact with meeting participants as well as follow along with written material presented during the meeting.

The vision augmentation system can also hand off between different devices according to operating mode and/or user verbal commands. For example, people detection mode 402 and navigation mode 404 might be employed with mobile devices such as a mobile phone, table, or smart glasses, whereas work mode might be used with a laptop or desktop computer. However, by no means are any of the operating modes limited to specific devices. By employing a cloud/web based implementation, the illustrative embodiments allow the user to access the vision augmentation system through multiple devices sequentially or even concurrently depending on the user's needs and circumstances.

In addition to visually impaired users, the illustrative embodiments can also assist users without visual challenges to multi-fold their productivity both with speech and text with natural language processing.

Figure 5:
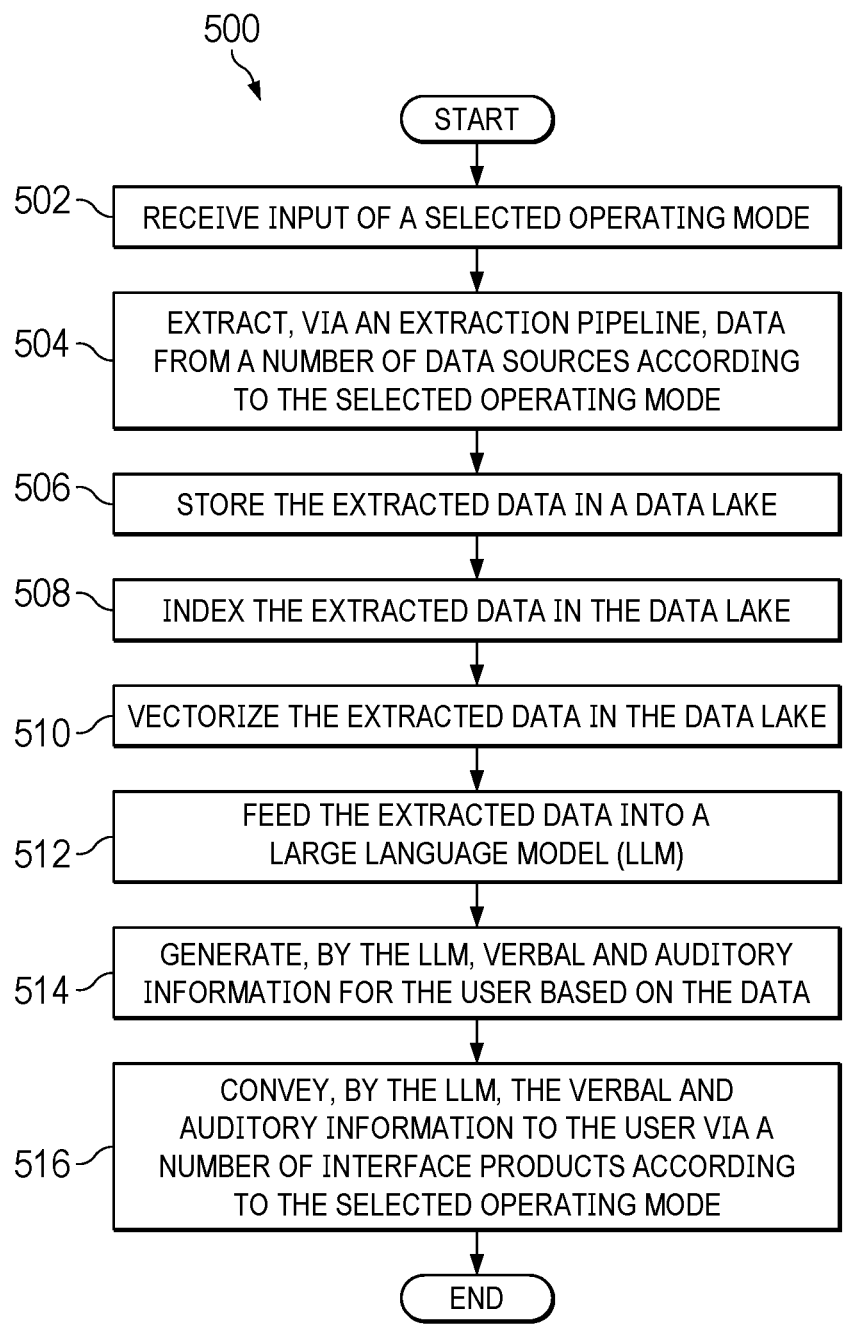
FIG. 5 depicts a flowchart illustrating a process for providing information to a user in accordance with an illustrative embodiment.

FIG. 5 depicts a flowchart illustrating a process for providing information to a user in accordance with an illustrative embodiment. Process 500 might be implemented in vision augmentation system 200 in FIG. 2.

Process 500 begins by receiving input of a selected operating mode (step 502). The operating mode can comprise one of people detection to identify persons in proximity to the user, workplace navigation to detect obstacles in the path of the user, text-to-speech, or work to assist the user to access functions of computer applications and issue verbal commands to the applications.

The operating mode may be selected manually by the user. The operating mode may also be selected according to a calendar schedule.

Process 500 extracts, via an extraction pipeline, data from a number of data sources according to the selected operating mode (step 504). The data sources might comprise productivity platforms, mobile devices, cameras, or smart glasses. The types of extracted data may comprise visual data, text data, optical character recognition images, data tables, graphs, charts, structured data, or unstructured data. The data may be extracted from the data sources according to a user profile.

Process 500 might store the extracted data in a data lake (step 506). Process 500 might also index the extracted data in the data lake (step 508) and vectorize the extracted data in the data lake (step 510).

Process 500 feeds the extracted data into a large language model (LLM) (step 512), and the LLM generates verbal and auditory information for the user based on the data (step 514).

The LLM conveys the verbal and auditory information to the user via a number of interface products according to the selected operating mode (step 516). Process 500 then ends.

Figure 6:
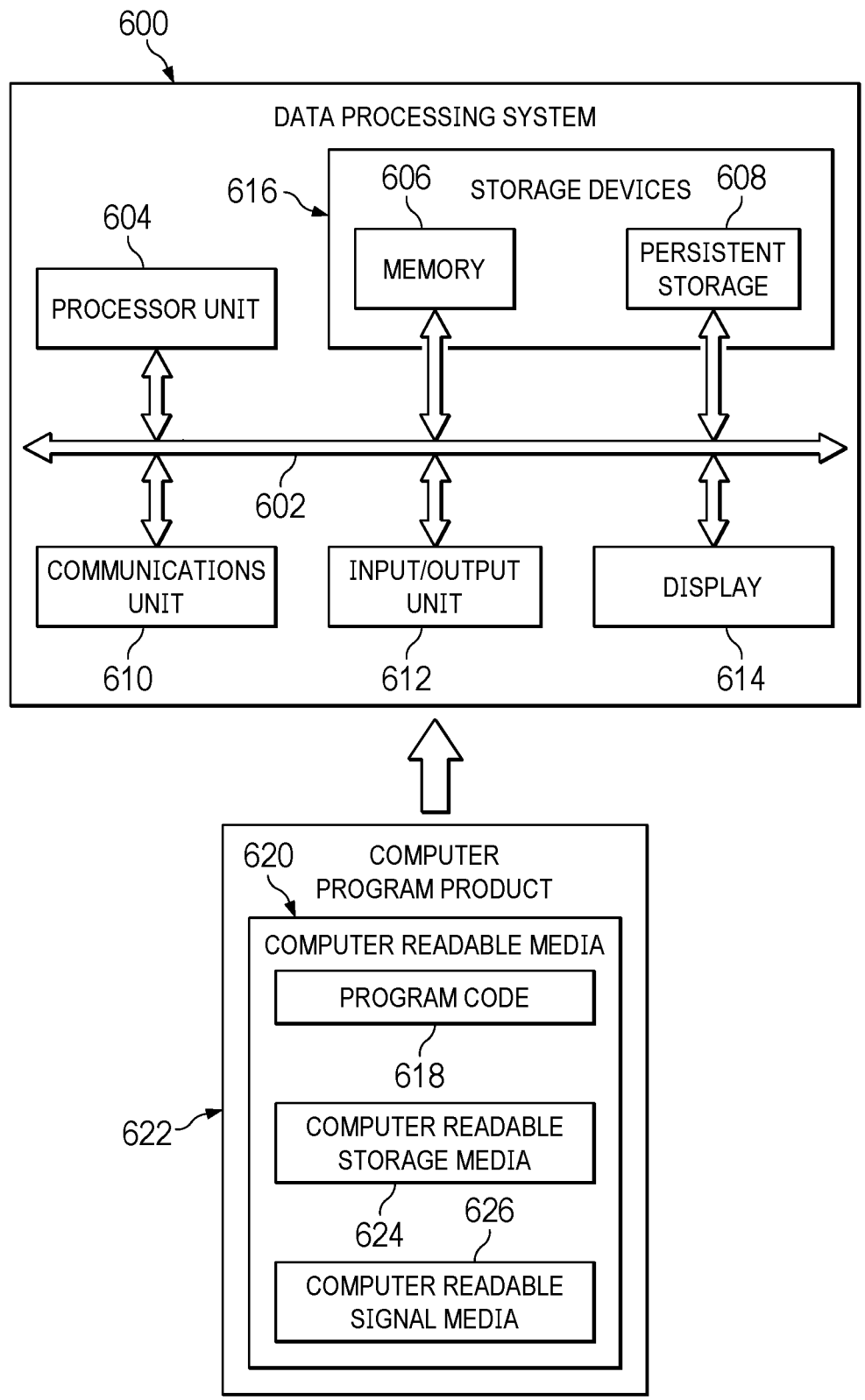
FIG. 6 is a block diagram of a data processing system in accordance with an illustrative embodiment.

Turning now to FIG. 6, an illustration of a block diagram of a data processing system is depicted in accordance with an illustrative embodiment. Data processing system 600 may be used to implement server computer 104 and server computer 106 and client devices 110 in FIG. 1, as well as computer system 250 in FIG. 2. In this illustrative example, data processing system 600 includes communications framework 602, which provides communications between processor unit 604, memory 606, persistent storage 608, communications unit 610, input/output unit 612, and display 614. In this example, communications framework 602 may take the form of a bus system.

Processor unit 604 serves to execute instructions for software that may be loaded into memory 606. Processor unit 604 may be a number of processors, a multi-processor core, or some other type of processor, depending on the particular implementation. In an embodiment, processor unit 604 comprises one or more conventional general-purpose central processing units (CPUs). In an alternate embodiment, processor unit 604 comprises one or more graphical processing units (GPUS).

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608. Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer-usable program code, or computer-readable program code that may be read and executed by a processor in processor unit 604. The program code in the different embodiments may be embodied on different physical or computer-readable storage media, such as memory 606 or persistent storage 608.

Program code 618 is located in a functional form on computer-readable media 620 that is selectively removable and may be loaded onto or transferred to data processing system 600 for execution by processor unit 604. Program code 618 and computer-readable media 620 form computer program product 622 in these illustrative examples. In one example, computer-readable media 620 may be computer-readable storage media 624 or computer-readable signal media 626.

In these illustrative examples, computer-readable storage media 624 is a physical or tangible storage device used to store program code 618 rather than a medium that propagates or transmits program code 618. Computer readable storage media 624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 618 may be transferred to data processing system 600 using computer-readable signal media 626. Computer-readable signal media 626 may be, for example, a propagated data signal containing program code 618. For example, computer-readable signal media 626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code 618.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component with an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of providing digital workplace accessibility to a visually impaired user, the method comprising:
   using a number of processors to perform:
   receiving input of a selected operating mode from a plurality of context-specific operating modes, wherein the plurality of context-specific operating modes comprises: a people detection mode, a workplace navigation mode for detecting obstacles in a path of the visually impaired user, a text-to-speech mode for converting visual content to auditory content, and work mode for assisting the visually impaired user to access functions of computer applications;
   extracting, via an extraction pipeline, multimodal data from a number of heterogeneous data sources according to the selected operating mode, wherein the multimodal data comprises at least two of visual data, text data, optical character recognition images, data tables, graphs, and charts and wherein the heterogeneous data sources include at least one of a productivity platform, a mobile device, a camera, and a smart glasses;
   performing data transformation operations on the extracted multimodal data, comprising at least vectorization and indexing of the extracted multimodal data;
   feeding the transformed multimodal extracted data into a large language model (LLM) that has been trained for generating accessibility output for visually impaired users according to the selected operating mode;
   generating, by the LLM, context-appropriate verbal and auditory information for the visually impaired user based on the transformed multimodal data; and
   conveying, by the LLM, the verbal and auditory information to the visually impaired user via a number of interface products according to the selected operating mode, thereby enabling the visually impaired user to interact with digital workplace content without visual perception.

2. The method of claim 1, wherein the operating mode is selected manually by the user.

3. The method of claim 1, wherein the operating mode is selected according to a calendar schedule.

4. The method of claim 1, wherein the selected operating mode comprises one of:
   people detection to identify persons in proximity to the user;
   workplace navigation to detect obstacles in the path of the user;
   text-to-speech; or
   work to assist the user to access functions of computer applications and issue verbal commands to the applications.

5. The method of claim 1, wherein the LLM learns to generate verbal and auditory information for the user according to the selected operating mode.

6. The method of claim 1, wherein the data sources comprise at least one of:
productivity platforms;
mobile devices;
cameras; or
smart glasses.

7. The method of claim 1, wherein the extracted data comprises at least one of:
visual data;
text data;
optical character recognition images;
data tables;
graphs;
charts;
structured data; or
unstructured data.

8. The method of claim 1, further comprising extracting the data from the data sources according to a user profile.

9. The method of claim 1, wherein the data is extracted according to user permissions.

10. The method of claim 1, further comprising:
receiving voice commands from the user; and
performing input or control functions in response to the voice commands.

11. The method of claim 1, further comprising storing the extracted data in a data lake.

12. The method of claim 11, further comprising:
indexing the extracted data in the data lake; and
vectorizing the extracted data in the data lake.

13. A system for providing digital workplace accessibility to a visually impaired user, the system comprising:
a storage device that stores program instructions;
one or more processors operably connected to the storage device and configured to execute the program instructions to cause the system to:
receive input of a selected operating mode from a plurality of context-specific operating modes, wherein the plurality of context-specific operating modes comprises: a people detection mode, a workplace navigation mode for detecting obstacles in a path of the visually impaired user, a text-to-speech mode for converting visual content to auditory content, and work mode for assisting the visually impaired user to access functions of computer applications;
extract, via an extraction pipeline, multimodal data from a number of heterogeneous data sources according to the selected operating mode, wherein the multimodal data comprises at least two of visual data, text data, optical character recognition images, data tables, graphs, and charts and wherein the heterogeneous data sources include at least one of a productivity platform, a mobile device, a camera, and a smart glasses;
performing data transformation operations on the extracted multimodal data, comprising at least vectorization and indexing of the extracted multimodal data;
feed the transformed multimodal extracted data into a large language model (LLM) that has been trained for generating accessibility output for visually impaired users according to the selected operating mode;
generate, by the LLM, context-appropriate verbal and auditory information for the visually impaired user based on the transformed multimodal data; and
convey, by the LLM, the verbal and auditory information to the user via a number of interface products according to the selected operating mode.

14. The system of claim 13, wherein the operating mode is selected manually by the user.

15. The system of claim 13, wherein the operating mode is selected according to a calendar schedule.

16. The system of claim 13, wherein the selected operating mode comprises one of:
people detection to identify persons in proximity to the user;
workplace navigation to detect obstacles in the path of the user;
text-to-speech; or
work to assist the user to access functions of computer applications and issue verbal commands to the applications.

17. The system of claim 13, wherein the LLM learns to generate verbal and auditory information for the user according to the selected operating mode.

18. The system of claim 13, wherein the data sources comprise at least one of:
productivity platforms;
mobile devices;
cameras; or
smart glasses.

19. The system of claim 13, wherein the extracted data comprises at least one of:
visual data;
text data;
optical character recognition images;
data tables;
graphs;
charts;
structured data; or
unstructured data.

20. The system of claim 13, wherein the processors further execute instructions to cause the system to extract the data from the data sources according to a user profile.

21. The system of claim 13, wherein the data is extracted according to user permissions.

22. The system of claim 13, wherein the processors further execute instructions to cause the system to:
receive voice commands from the user; and
perform input or control functions in response to the voice commands.

23. The system of claim 13, further comprising storing the extracted data in a data lake.

24. The system of claim 23, wherein the processors further execute instructions to cause the system to:
index the extracted data in the data lake; and
vectorize the extracted data in the data lake.

25. A computer program product for providing digital workplace accessibility to a visually impaired user, the computer program product comprising:
a computer-readable storage medium having program instructions embodied thereon to perform the steps of:
receiving input of a selected operating mode from a plurality of context-specific operating modes, wherein the plurality of context-specific operating modes comprises: a people detection mode, a workplace navigation mode for detecting obstacles in a path of the visually impaired user, a text-to-speech mode for converting visual content to auditory content, and work mode for assisting the visually impaired user to access functions of computer applications;
extracting, via an extraction pipeline, multimodal data from a number of heterogeneous data sources according to the selected operating mode, wherein the multimodal data comprises at least two of visual data, text data, optical character recognition images, data tables, graphs, and charts and wherein the heterogeneous data sources include at least one of a productivity platform, a mobile device, a camera, and a smart glasses;

performing data transformation operations on the extracted multimodal data, comprising at least vectorization and indexing of the extracted multimodal data;

feeding the transformed multimodal extracted data into a large language model (LLM) that has been trained for generating accessibility output for visually impaired users according to the selected operating mode;

generating, by the LLM, context-appropriate verbal and auditory information for the visually impaired user based on the transformed multimodal data; and conveying, by the LLM, the verbal and auditory information to the user via a number of interface products according to the selected operating mode, conveying, by the LLM, the verbal and auditory information to the visually impaired user via a number of interface products according to the selected operating mode, thereby enabling the visually impaired user to interact with digital workplace content without visual perception.

* * * * *